(12) United States Patent
Thomas et al.

(10) Patent No.: US 11,720,095 B2
(45) Date of Patent: Aug. 8, 2023

(54) REMOTE CONTROLLED FLEXIBLE MODULAR PLATFORM SYSTEM

(71) Applicant: Ford Global Technologies, LLC, Dearborn, MI (US)

(72) Inventors: Galen Keith Thomas, Dearborn, MI (US); Kerry Lance Paskell, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 339 days.

(21) Appl. No.: 16/909,462

(22) Filed: Jun. 23, 2020

(65) Prior Publication Data

US 2021/0397180 A1 Dec. 23, 2021

(51) Int. Cl.
*G05D 1/00* (2006.01)
*G05B 19/418* (2006.01)
*B62D 63/02* (2006.01)
*G05D 1/02* (2020.01)

(52) U.S. Cl.
CPC ......... *G05D 1/0027* (2013.01); *B62D 63/025* (2013.01); *G05B 19/41805* (2013.01); *G05B 19/41895* (2013.01); *G05D 1/0022* (2013.01); *G05D 1/0238* (2013.01); *G05B 2219/50393* (2013.01)

(58) Field of Classification Search
CPC .. G05D 1/0027; G05D 1/0011; G05D 1/0291; G05D 1/0297; G05D 1/0022; G05D 2201/0216; G05D 1/0238; G05B 19/41805; G05B 19/41895; G05B 2219/32388; G05B 2219/31044; G05B 2219/50393; B62D 63/025; B62D 65/022
See application file for complete search history.

(56) References Cited

U.S. PATENT DOCUMENTS

| 7,036,848 | B2 | 5/2006 | Chernoff et al. | |
|---|---|---|---|---|
| 2010/0138082 | A1* | 6/2010 | Ohta | B62D 1/286 701/2 |
| 2012/0053775 | A1* | 3/2012 | Nettleton | G16Z 99/00 701/24 |
| 2014/0277698 | A1* | 9/2014 | Combs | G05B 19/4189 198/460.1 |
| 2016/0004252 | A1* | 1/2016 | Nagasawa | G05D 1/021 701/26 |

(Continued)

FOREIGN PATENT DOCUMENTS

CN 109625092 4/2019
WO WO-2021013228 A1 * 1/2021 ............. G05D 1/101

*Primary Examiner* — Khoi H Tran
*Assistant Examiner* — Tanner L Cullen
(74) *Attorney, Agent, or Firm* — Burris Law, PLLC

(57) ABSTRACT

A system for remote control of modular vehicle subassemblies within a vehicle assembly facility includes a central management system having predetermined assembly paths and specifications for the modular vehicle subassemblies and a zone management system having zone controllers in communication with the central management system and in communication with the onboard controllers of the modular vehicle subassemblies. The zone controllers are configured to receive transient data from the onboard controllers of the modular vehicle subassemblies and manage movement of the modular vehicle subassemblies throughout the zones within the vehicle assembly facility.

18 Claims, 18 Drawing Sheets

(56) References Cited

U.S. PATENT DOCUMENTS

| | | | |
|---|---|---|---|
| 2017/0090473 A1* | 3/2017 | Cooper | B61L 15/0027 |
| 2017/0192427 A1* | 7/2017 | Bivans | E02F 9/205 |
| 2018/0275681 A1 | 9/2018 | Gariepy et al. | |
| 2019/0054966 A1* | 2/2019 | Park | G05D 1/0033 |
| 2019/0212724 A1* | 7/2019 | Phuyal | G05D 1/0022 |
| 2019/0276241 A1* | 9/2019 | Royce | G05B 19/41865 |
| 2020/0073363 A1* | 3/2020 | Albrecht | G05B 19/4155 |
| 2020/0140028 A1* | 5/2020 | Wells | G05D 1/0225 |
| 2020/0198714 A1* | 6/2020 | Watanabe | B62D 65/18 |
| 2021/0114219 A1* | 4/2021 | Keravala | B25J 9/161 |
| 2021/0179153 A1* | 6/2021 | Harasaki | B61L 27/30 |

* cited by examiner

REMOTE CONTROLLED FLEXIBLE MODULAR PLATFORM SYSTEM

FIELD

The present disclosure relates to industrial manufacturing, and more particularly to methods of assembling motor vehicles within an assembly facility.

BACKGROUND

The statements in this section merely provide background information related to the present disclosure and may not constitute prior art.

Vehicle assembly plants are designed and built to support a projected vehicle assembly volume based on mechanical infrastructure requirements needed to support manufacturing operations. And such mechanical infrastructure requirements typically include conveyer systems and/or automatic guided vehicle (AGV) based systems to move vehicle subassemblies from station to station along an assembly line. However, the time, investment and capital expenditure needed to build conveyer systems or to adapt AGVs for specific application tasks can be prohibitive.

These issues associated with moving vehicle subassemblies along assembly lines in vehicle assembly plants, among other issues related to manufacturing different product configurations in the same assembly facility, are addressed by the present disclosure.

SUMMARY

This section provides a general summary of the disclosure and is not a comprehensive disclosure of its full scope or all of its features.

In one form of the present disclosure, a system for remote control of a plurality of modular vehicle subassemblies within a vehicle assembly facility is provided. The modular vehicle subassemblies are self-transportable and include a vehicle frame, an onboard controller, an onboard communications link, sensors, a drive system, wheels, a steering system, and a propulsion system. The system includes a central management system having predetermined assembly paths and specifications for the modular vehicle subassemblies, and a zone management system with a plurality of zone controllers in communication with the central management system and in communication with the onboard controllers of the modular vehicle subassemblies. The plurality of zone controllers are configured to receive transient data from the onboard controllers of the modular vehicle subassemblies and manage movement of the modular vehicle subassemblies throughout a plurality of zones within the vehicle assembly facility.

In some variations, the plurality of zone controllers are in communication with adjacent zone controllers, and in at least one variation the plurality of zone controllers are in communication with the modular vehicle subassemblies via a plurality of communications links. In at least one variation, the plurality of communications links includes a primary link to an active zone controller and a secondary link to an adjacent zone controller. In some variations, the plurality of zone controllers are in communication with the modular vehicle subassemblies via a plurality of wireless communications links.

In at least one variation, the modular vehicle subassemblies are tethered for testing prior to entering a first active zone.

The transient data received from the onboard controllers of the modular vehicle subassemblies includes data on position of the modular vehicle subassemblies, status of systems of the modular vehicle subassemblies, current assembly state of the modular vehicle subassemblies, and proper positioning of parts on the modular vehicle subassemblies, among others. Also, the status of systems includes battery level, tire pressure, fluid levels, and fluid pressures, among others. In at least one variation, the transient data is communicated to the central management system for management and control of a plurality of zone management systems.

In some variations, the sensors of the modular vehicle subassemblies include a combined sensor array with optical sensors and proximity sensors. Also, in at least one variation the system includes a plurality of fixed proximity sensors disposed within each of the plurality of zones within the vehicle assembly facility. For example, in some variations the system includes a plurality of facility-based sensors disposed throughout the vehicle assembly facility and the plurality of facility-based sensors are configured to transmit at least one of geometric, thermal, acoustic, vibrational, and optical data to each of the zone controllers.

In another form of the present disclosure, a method for remote control of a plurality of modular vehicle subassemblies within a vehicle assembly facility is provided. The modular vehicle subassemblies are self-transportable and include a vehicle frame, an onboard controller, sensors, a drive system, wheels, a steering system, and a propulsion system. The method includes storing predetermined assembly paths and specifications for the modular vehicle subassemblies in a central management system, receiving transient data from the onboard controllers of the modular vehicle subassemblies at a plurality of zone controllers, and remotely controlling movement of the modular vehicle subassemblies by the plurality of zone controllers based on the transient data. The plurality of zone controllers is in communication with the central management system and the central management system compares the transient data with the predetermined assembly paths and specifications.

In some variations, positions of each modular vehicle subassembly are communicated to the central management system. In at least one variation the modular vehicle subassemblies are redirected by the central management system to a maintenance zone based on the transient data received by the zone controllers.

In some variations, each zone controller monitors positions of incoming modular vehicle subassemblies from an active zone. And in at least one variation each zone controller is in communication with adjacent zone controllers.

In some variations, the method includes redirecting or stopping the modular vehicle subassembly based on detection of an obstacle. Also, in at least one variation the method includes redirecting the modular vehicle subassembly if a monitored path of the modular vehicle subassembly deviates from the predetermined assembly paths beyond a path tolerance.

In still another form of the present disclosure, a method of assembling a plurality of vehicles includes providing a plurality of modular vehicle subassemblies within a vehicle assembly facility. The modular vehicle subassemblies are self-transportable and including a vehicle frame, an onboard controller, sensors, a drive system, wheels, a steering system, and a propulsion system. The method also includes storing predetermined assembly paths and specifications for the modular vehicle subassemblies in a central management system and receiving transient data from the onboard controllers of the modular vehicle subassemblies at a plurality of zone controllers. The plurality of zone controllers are in communication with the central management system such that the transient data is compared with the predetermined assembly paths and specifications. The method includes remotely controlling movement of the modular vehicle subassemblies by the plurality of zone controllers based on the transient data throughout a plurality of zones within the vehicle assembly facility and successively assembling components to the modular vehicle subassemblies throughout the plurality of zones. In some variations, a configuration of at least one of the plurality of vehicles can be or is modified during movement through the plurality of zones.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
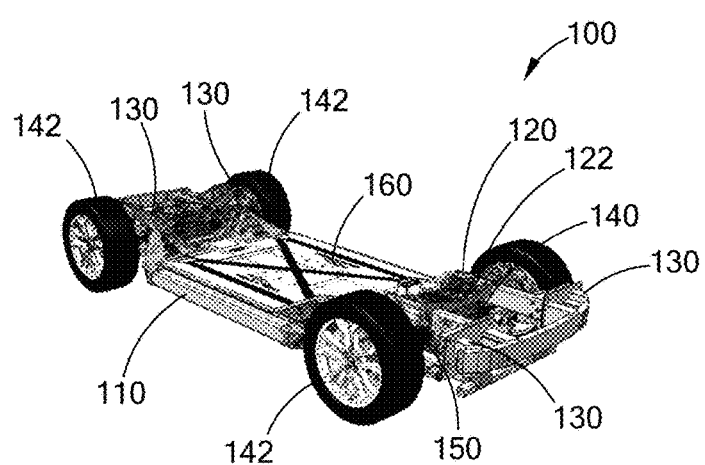
FIG. 1 is a modular vehicle assembly according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a modular vehicle subassembly (MVS) 100 according to the teachings of the present disclosure is shown. The MVS 100 includes a vehicle frame 110, an onboard controller 120, an onboard communications link 122, sensors 130, a drive system 140, wheels 142, a steering system 150, and a propulsion system 160. As used herein, the phrase "communication link" refers to a communication channel that connects two or more devices for the purpose of data transmission. In some variations, the onboard communications link 122 is a wireless communications link with a wireless signal receiver/transmitter that includes an antenna. In at least one variation, the MVS 100 is for an electric or hybrid vehicle and the propulsion system 160 includes one or more charged batteries that provides energy to the onboard controller 120, sensors 130, drive system 140, and steering system 150.

The MVS 100, and other MVSs 100 disclosed herein, is manufactured at a vehicle assembly facility and is self-transportable. That is, the MVS 100 is configured to move using its own power and steering through the same vehicle assembly facility where it was manufactured and/or through a separate vehicle assembly facility where additional assembly operations occur. For example, and with reference to FIG. 2, a plurality of MVSs 100 (also referred to herein simply as "MVs 100") are shown tethered together (illustrated by the dotted line between the MVSs 100) and moving under remote control using their own power and steering along a path prior to entering a first active zone discussed in greater detail below. In some variations of the present disclosure, the MVSs 100 are tethered for testing prior to entering a first active zone such that components and/or functions of the MVSs 100 are tested and determined to be in desired operating condition before additional structures and/or components are assembled onto the MVSs 100.

In some variations of the present disclosure, the MVSs 100 entering a vehicle assembly facility that assembles a "top hat" onto the MVSs 100. As used herein the term phrase "top hat" refers to one or more vehicle upper body structures that can share a common platform (i.e., a common MVS 100). For example, the upper body structures can vary from a crossover vehicle to a sedan vehicle to a coupe vehicle. Accordingly, vehicle assembly facilities that assembly different vehicle upper body structures onto a common MVS 100 enhance economies of scale and product differentiation.

The sensors 130 of the MVS 100 can be proximity sensors, visual sensors, among others, that provide transient data to the onboard controller 120 and/or zone controllers discussed below. Non-limiting examples of transient data provided by the sensors 130 include data on or related to MVS 100 location, MVS 100 position, MVS 100 movement, obstacle detection along a path the MVS 100 is moving along, and general environmental conditions around the MVS 100, among others. Accordingly, the sensors 130 provide notification on how a given MVS 100 is performing operational activities such as alignment on an assembly path, tracking along the assembly path, and obstacle avoidance on the assembly path as the MVS 100 moves within a vehicle assembly facility.

Figure 2:
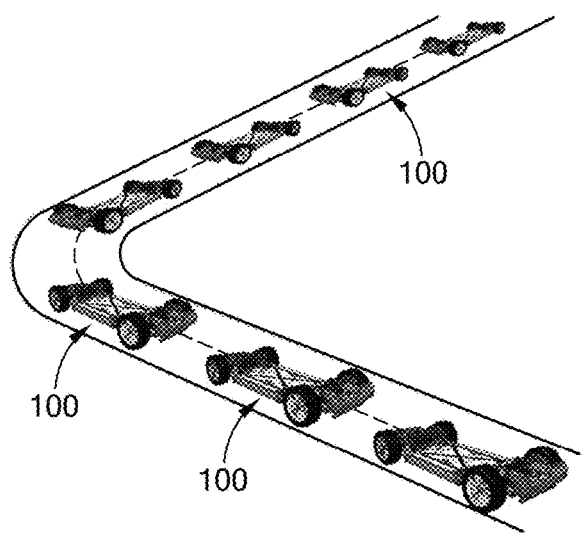
FIG. 2 is a plurality of modular vehicle assemblies tethered for testing prior to entering a first active zone of a modular vehicle assembly according to the teachings of the present disclosure.
Figure 3:
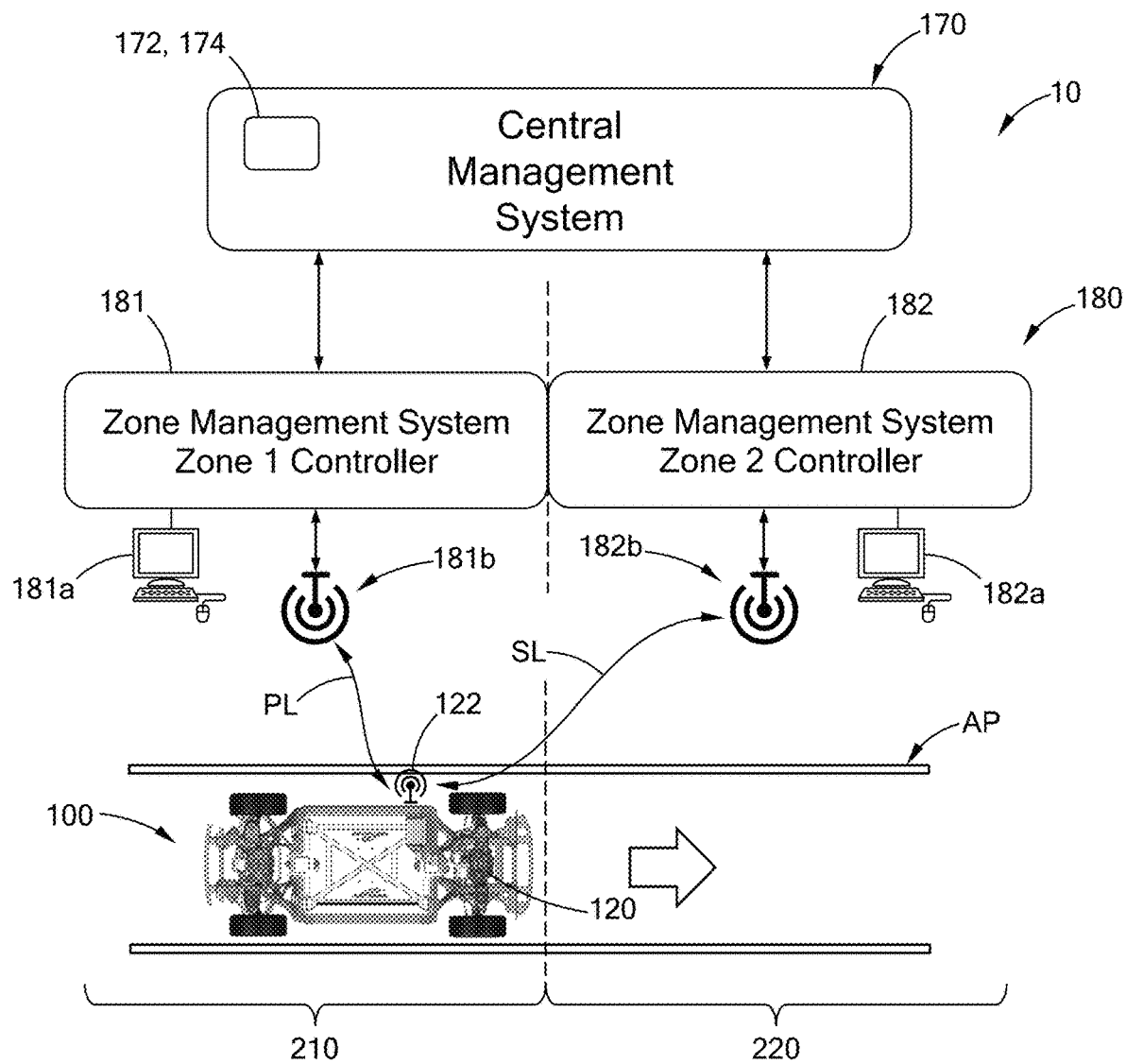
FIG. 3 is a system for remote controlling a plurality of modular vehicle subassemblies as a modular vehicle subassembly transitions from a first zone to a second zone according to the teachings of the present disclosure.

Referring to FIG. 3, a system 10 for remote control of the plurality of MVSs 100 in FIG. 2 is shown. The system 10 includes a central management system 170 with a plurality of stored predetermined paths 172 and specifications 174 for the plurality of MVS 100. That is, the central management system 170 is configured to command each of the plurality of MVSs 100 in FIG. 2 to move along a predetermined assembly path 'AP' (also referred to herein simply as "assembly path AP") within a vehicle assembly facility via remote control as discussed in greater detail below.

The system 10 also includes a zone management system 180 with a plurality of zone controllers 181, 182 for a plurality of zones 210, 220, respectively. The plurality of zone controllers 181, 182 are in communication with the central management system 170 and in communication with the onboard controllers 120 of the MVSs 100. That is, as the MVS 100 moves through zone 210 shown in FIG. 3, the zone controller 181 is in communication with the onboard controller 120 via the onboard communication link 122 and a zone controller communication link 181b, and as the MVS 100 moves through zone 220 the zone controller 183 is in communication with the onboard controller 120 via the onboard communication link 122 and a zone controller communication link 182b.

In some variations the zone controller communication links 181b, 182b are wireless communication links 181b, 182b. Also, and as shown in FIG. 3, in some variations the plurality of communication links include a primary link 'PL' and a secondary link 'SL'. In at least one variation, the primary link is between an MVS 100 and an active zone controller (e.g., a zone controller for a zone where an MVS is presently located) and the secondary link 'SL' between an MVS 100 and an adjacent zone controller (e.g., a zone controller for a zone where the MVS will enter).

In at least one variation, the plurality of zone controllers 181, 182, and other zone controllers disclosed herein, have a manual interface system 181a, 182a, (e.g., a desktop or laptop computer) configured for entering and/or retrieving data from the plurality of zone controllers 181, 182. In at least one variation, one or more of the manual interface systems 181a, 182a is configured to provide data and/or notification to the central management system 170 regarding conditions of the assembly path AP. Non-limiting examples of such conditions include material shortages, operational problems, emergency problems within the vehicle assembly facility, among others.

The one or more of the zone controller communications link 181b, 182b are configured to receive and/or transmit data from and/or to the onboard controllers 120 of the MVSs 100 such that movement of the MVSs 100 throughout the plurality of zones within the vehicle assembly facility is managed and controlled. For example, in some variations the plurality of zone controllers 181, 182 are configured to receive transient data from the onboard controllers 120 of the MVSs 100 and manage movement of the MVSs 100 throughout a plurality of zones within a vehicle assembly facility. Non-limiting examples of the transient data include positions of the MVSs 100, status of systems of the MVSs 100, current assembly state of the MVSs 100, proper positioning of parts on the MVSs 100, among others. And non-limiting example of the status of systems of the MVSs 100 battery charge level of the MVSs 100, tire pressure of the tires of the MVSs 100, fluid levels of the MVSs 100, fluid pressures in the MVSs 100, among others.

Figure 4:
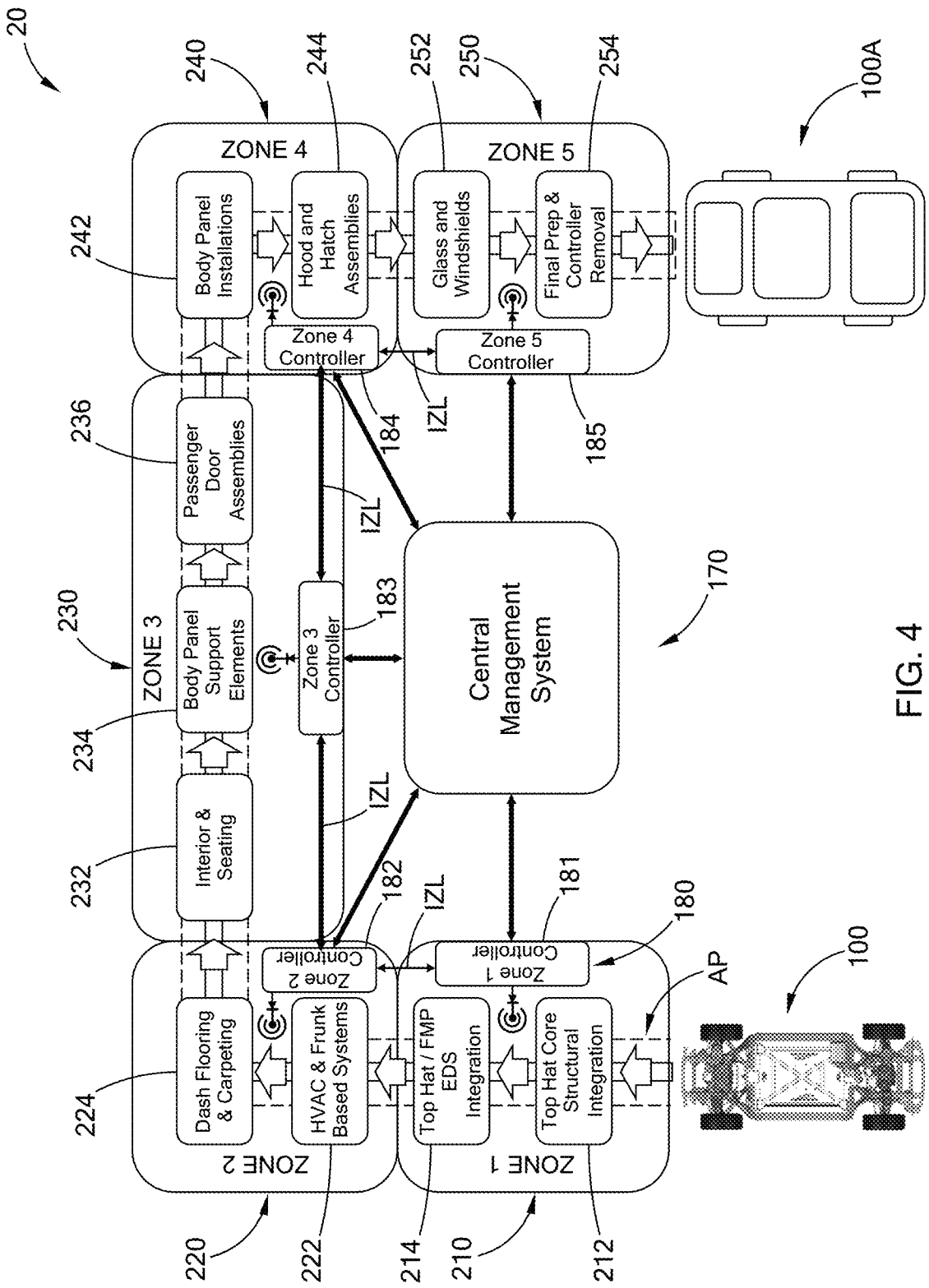
FIG. 4 shows the system for remote controlling a plurality of modular vehicle subassemblies in FIG. 3 moving a modular vehicle subassembly through a plurality of zones and providing a fully assembled vehicle according to the teachings of the present disclosure.

Referring to FIG. 4, a vehicle assembly facility 20 using remote control to move a plurality of MVSs 100 (only one MVS 100 shown for clarity) through five zones 210, 220, 230, 240, 250 along an assembly path AP with is shown. The vehicle assembly facility 20 includes the central management system 170 and the zone management system 180. For the example shown in FIG. 4, the zone management system 180 has five zone controllers 181, 182, 183, 184, 185 for the five zones 210, 220, . . . 250 and each of five zone controllers 181, 182, . . . 185 are in communication with adjacent zone controllers via interzone links 'IZL'. The central management system 170 controls the movement of the MVSs 100 remotely through zones 210, 220, . . . 250 and assembly stations within each zone. Non-limiting examples of assembly stations within the zones 210, 220, . . . 250 include a top hat core structural integration station 212 and a top hat/MVS engine data scan (EDS) integration station 214 in zone 210, a heating, venting, and air conditioning (HVAC) and a trunk/frunk based system station 222, and a dash, flooring and carpet station 224 in zone 220, an interior and seating station 232, a body panel support elements station 234, and a passenger door assembly station 236 in zone 230, a body panels installation station 242 and a hood and hatch assemblies station 244 in zone 240, and a glass and windshields station 252 and a final preparation and controller removal station 254 in zone 250. It should be understood that various parts and components are assembled onto the MVS 100 at each of the stations such that an assembled vehicle 100A is provided when the MVS 100 exits zone 250.

Figure 5:
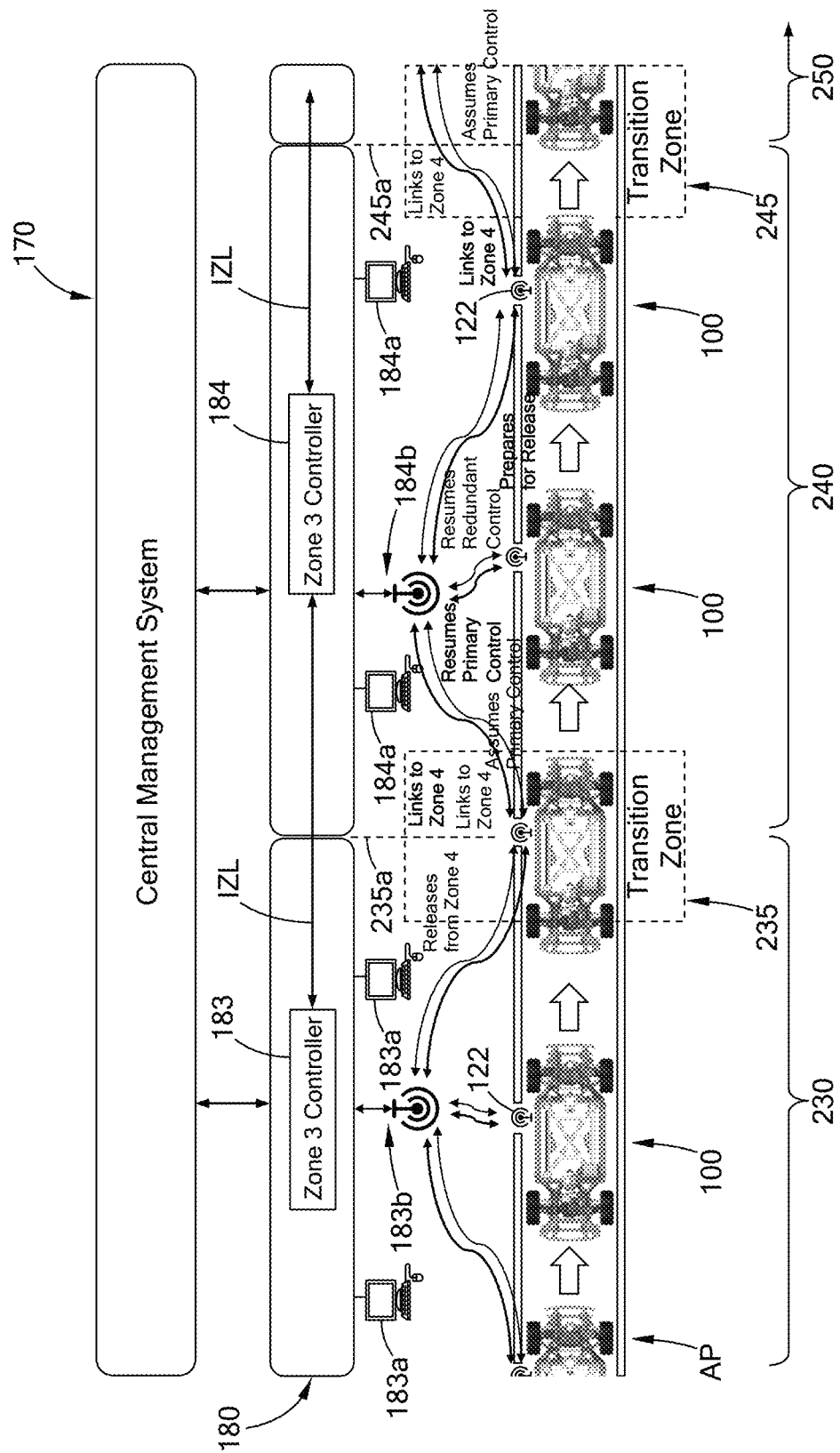
FIG. 5 shows the system for remote controlling a plurality of modular vehicle subassemblies in FIG. 3 moving a plurality modular vehicle subassemblies through the third and fourth zones shown in FIG. 4 according to the teachings of the present disclosure.

Referring to FIGS. 5 and 5A-5J, operation of the central management system 170 and the zone management system 180 is described in relation to movement of MVSs 100 through zones 230, 240, and 250. That is, FIG. 5 shows movement of a plurality of MVSs 100 through zones 230, 240, and 250, and FIGS. 5A-5J show the sequence of a single MVS 100 moving through zones 230, 240, and 250. In some variations, a transition zone 245 is defined between zone 230 and zone 240, and a transition zone 245 between zone 240 and zone 250, and the transition zones 235, 245 are configured for "hand off" of control and management of an MVS 100 from an active zone controller to an adjacent zone controller as described below.

Figure 5A:
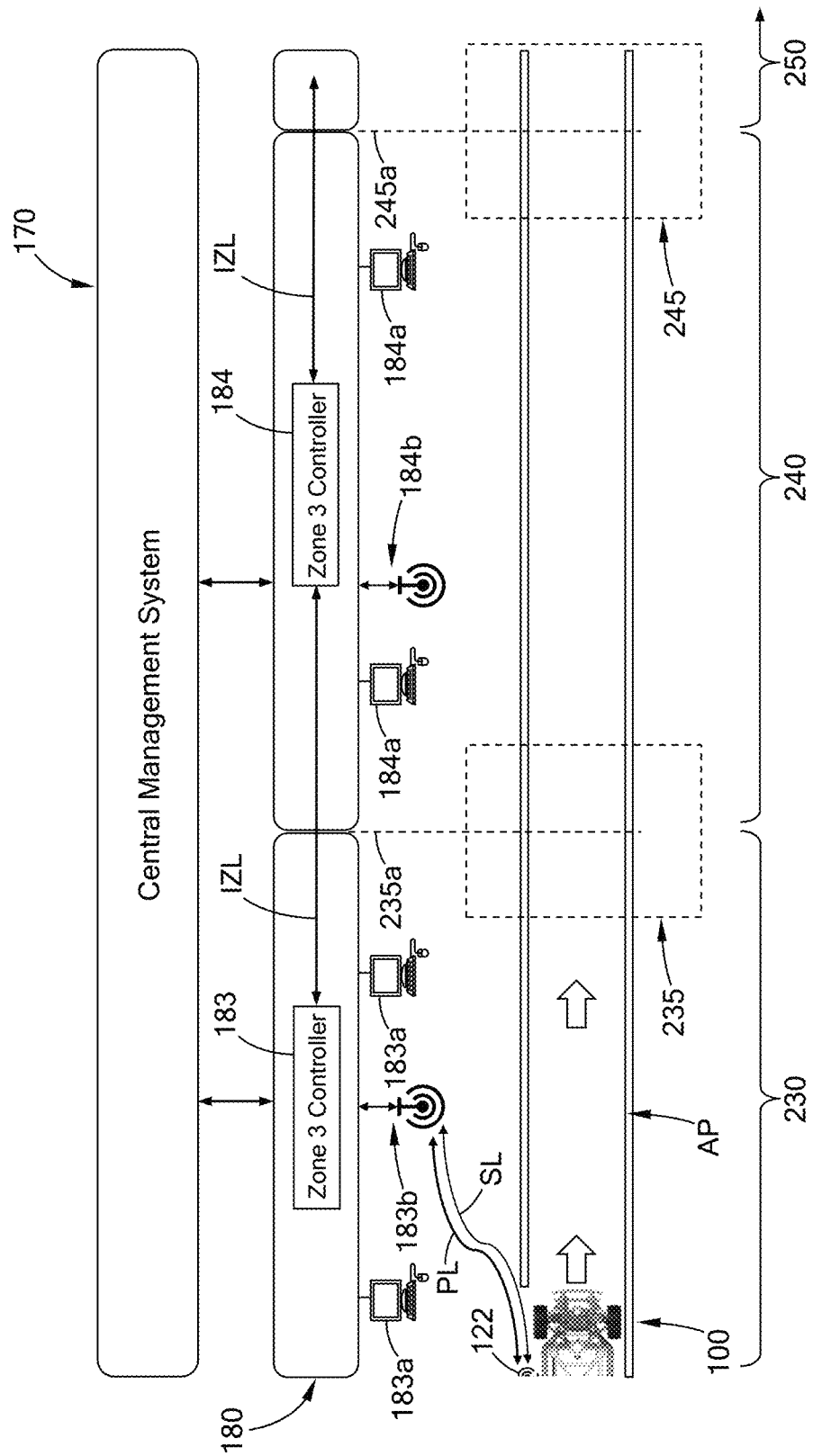
FIG. 5A shows a modular vehicle subassembly entering the third zone in FIG. 4 according to the teachings of the present disclosure.
Figure 5B:
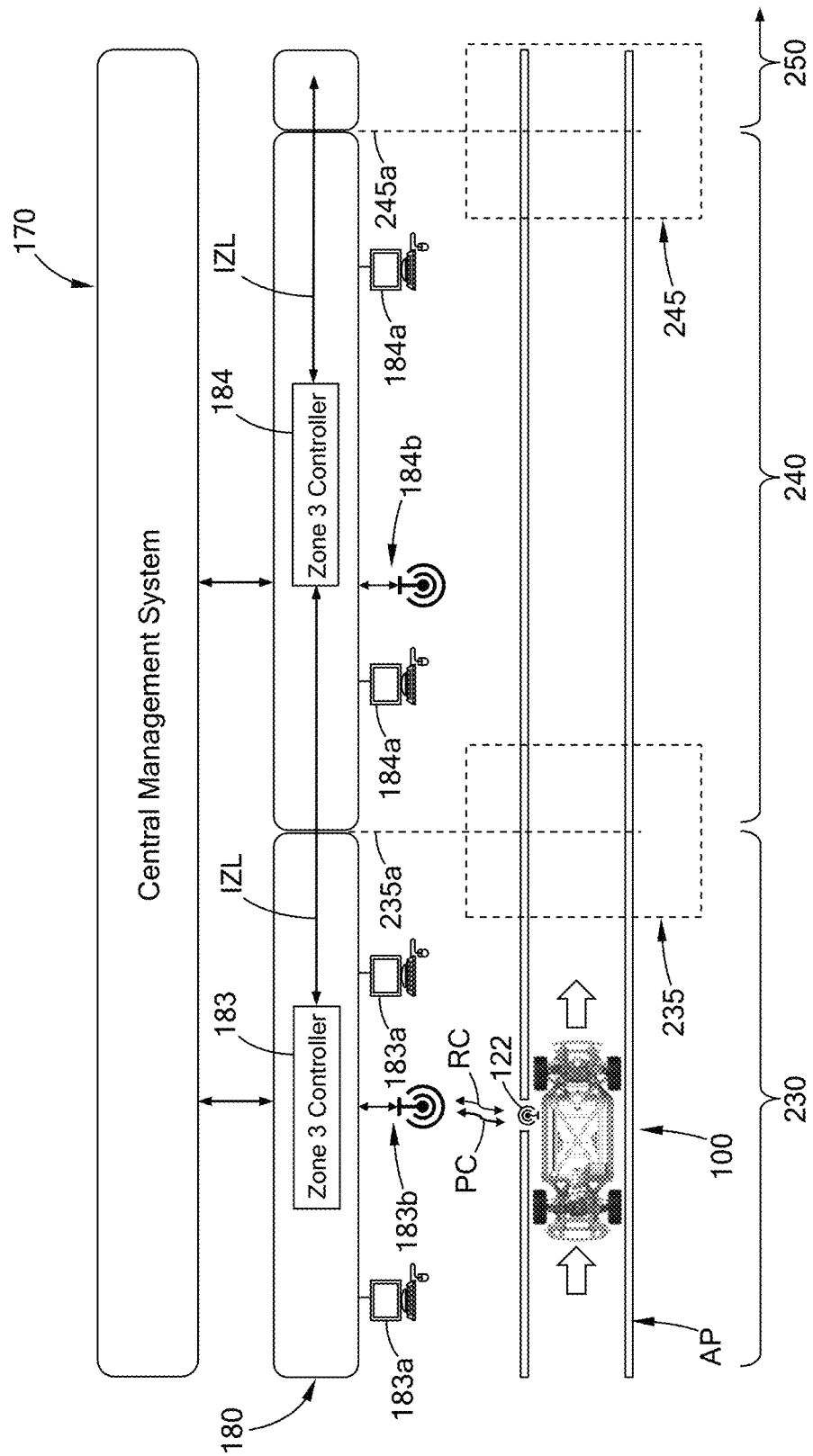
FIG. 5B shows the modular vehicle subassembly shown in FIG. 5A moving through the third zone in FIG. 4 according to the teachings of the present disclosure.
Figure 5C:
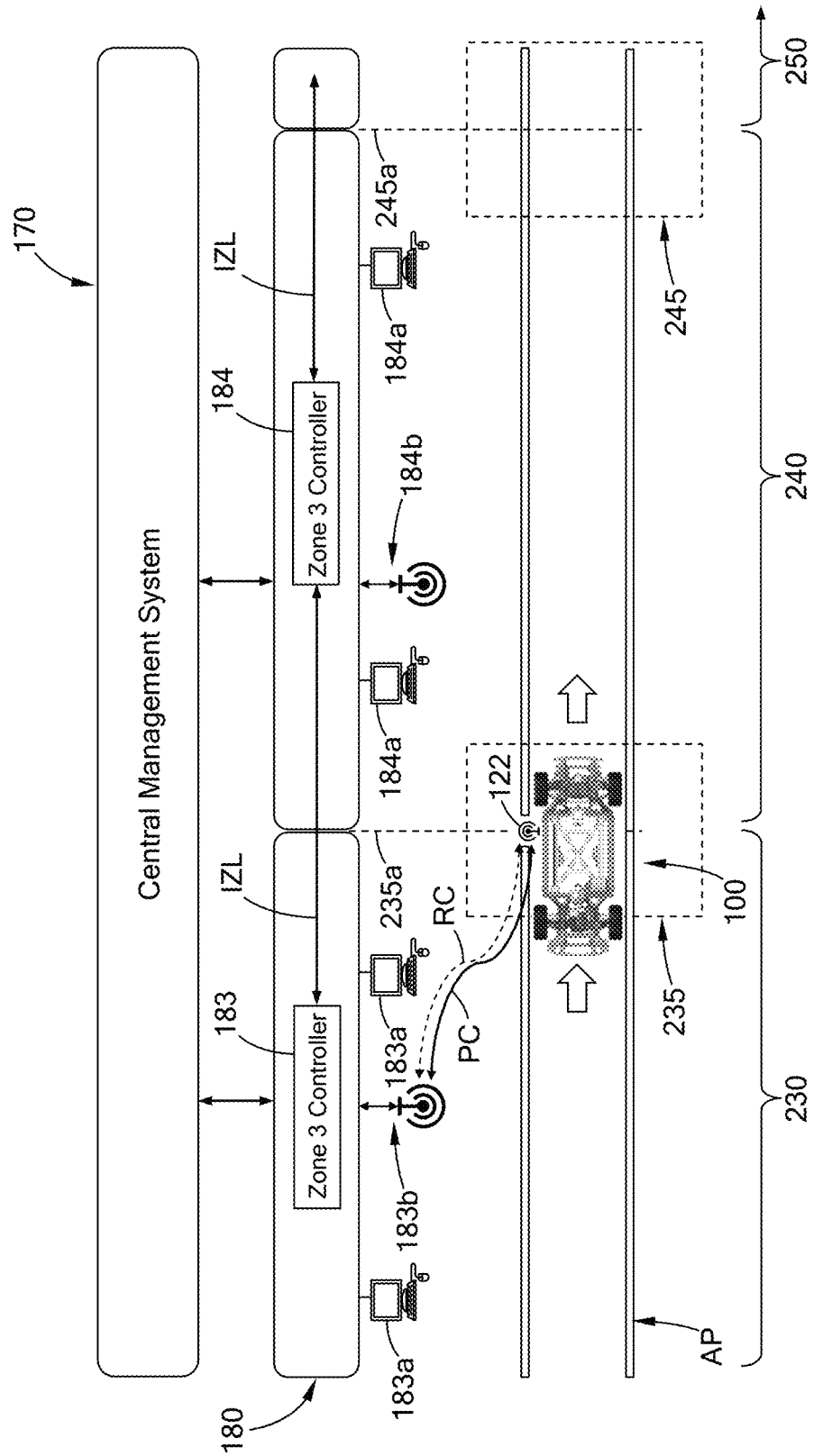
FIG. 5C shows the modular vehicle subassembly shown in FIG. 5A transitioning from the third zone to the fourth zone in FIG. 4 according to the teachings of the present disclosure.

Referring now to FIGS. 5A-5B, an MVS 100 is shown moving through zone 230 using its own power and steering. The onboard controller 120 (FIG. 1) of the MVS 100 is in communication with the zone controller 183 via the onboard communications link 122 and the zone controller communications link 183b. In at least one variation, the zone controller 183 uses a dual band or dual channels to transmit and receive instructions and data and thereby remotely control the MVS 100. For example, in some variations the zone controller 183 and the onboard controller 120 communicate using the primary link PL and the secondary link SL. In such variations, the primary link PL controls the movement of the MVS 100 and the secondary link SL monitors the movement of the MVS 100. Also, it should be understood that using dual channels enhances connectivity between the zone controller 183 and the onboard controller 120.

As the zone controller 183 manages the operation and movement of the MVS 100 through zone 230, the interior and seating are installed at station 232 (FIG. 5), body panel support elements are installed at station 234 (FIG. 5), and passenger doors are assembled and hung at station 236 (FIG. 5). In some variations of the present disclosure, the zone controller 183, and other zone controllers discussed herein, provide process related services such as instructions and/or data related to tracking of the MVS 100 (i.e., MVS tracking), guidance of the MVS 100 (i.e., MVS guidance), movement control and coordination of the MVS 100 (i.e., MVS movement control and coordination), and management of the signaling interface between the zone controller 183 and the onboard controller 120, among others.

Figure 5D:
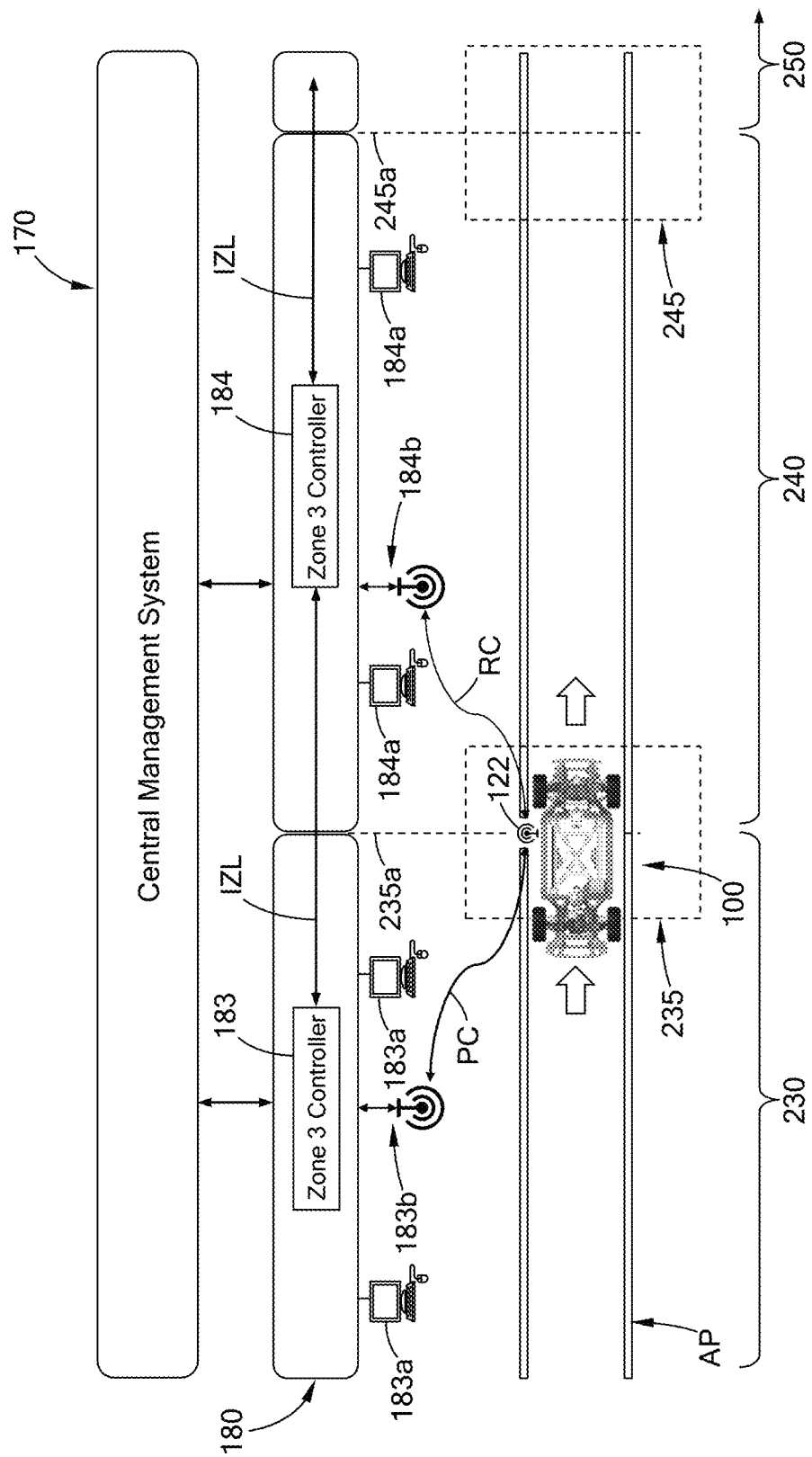
FIG. 5D shows the modular vehicle subassembly shown in FIG. 5A transitioning from the third zone to the fourth zone in FIG. 4 according to the teachings of the present disclosure.
Figure 5E:
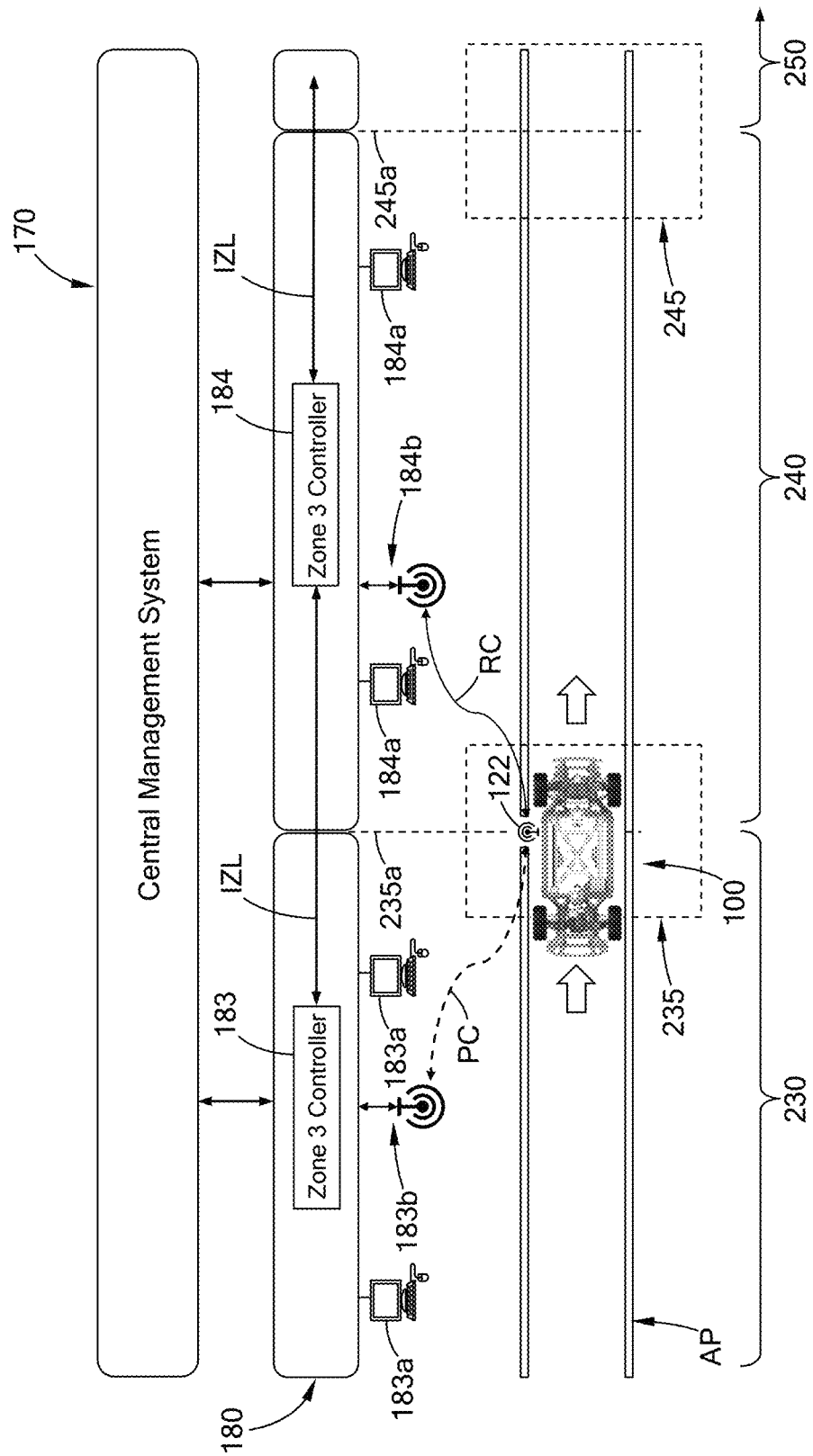
FIG. 5E shows the modular vehicle subassembly shown in FIG. 5A transitioning from the third zone to the fourth zone in FIG. 4 according to the teachings of the present disclosure.
Figure 5F:
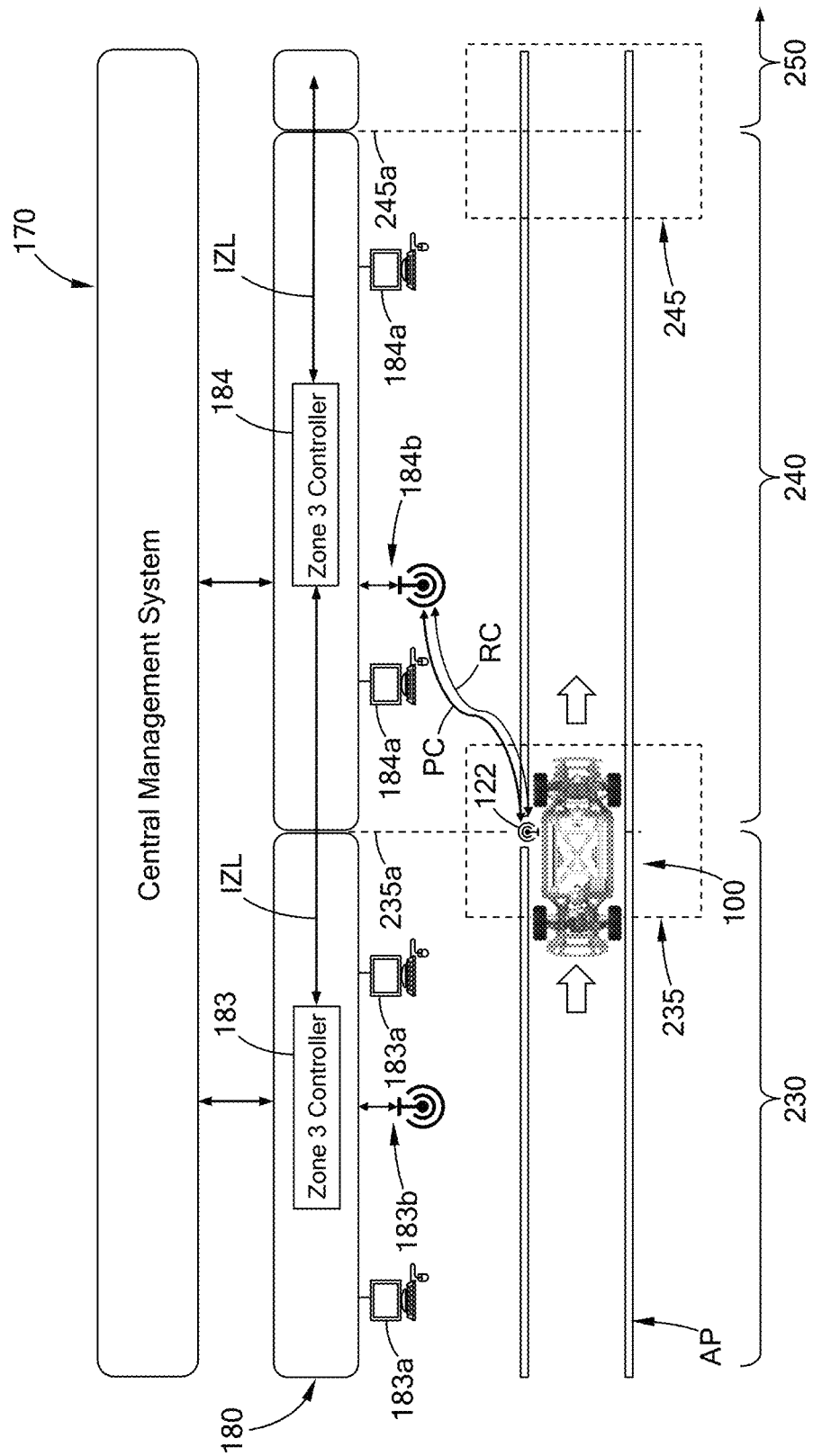
FIG. 5F shows the modular vehicle subassembly shown in FIG. 5A transitioned from the third zone to the fourth zone in FIG. 4 according to the teachings of the present disclosure.
Figure 5G:
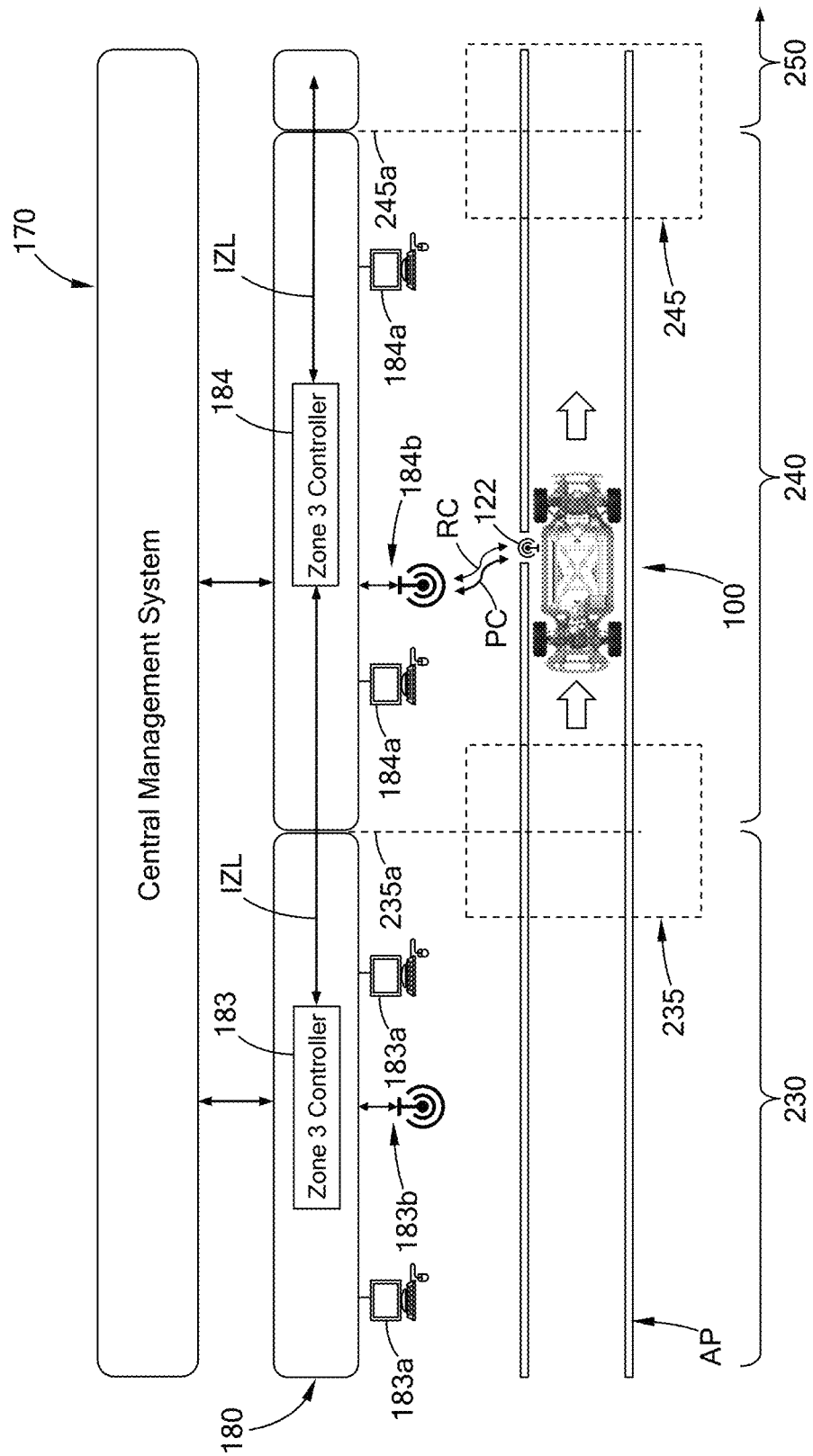
FIG. 5G shows the modular vehicle subassembly shown in FIG. 5A moving through the fourth zone in FIG. 4 according to the teachings of the present disclosure.
Figure 5H:
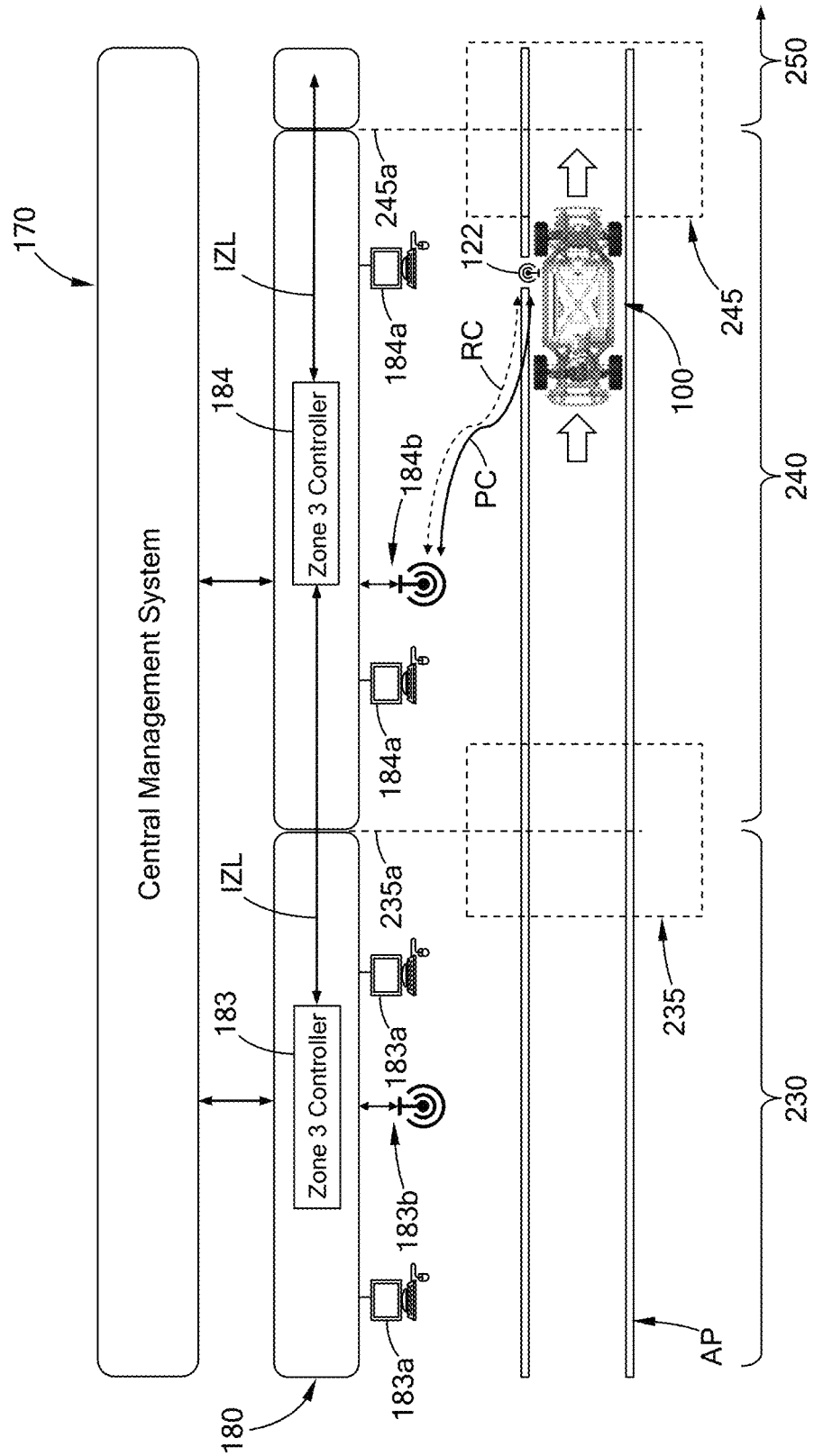
FIG. 5H shows the modular vehicle subassembly shown in FIG. 5A transitioning from the fourth zone to the fifth zone in FIG. 4 according to the teachings of the present disclosure.

Referring now to FIGS. 5C-5F "hand-off" of control and management of the MVS 100 from zone 230 to zone 240 is shown. Particularly, as the MVS 100 approaches zonal boundary 235a, i.e., a boundary between zones 230 and 245, the MVS 100 moves into the transition zone 235. At a predefined distance from the zonal boundary 235a the zone controller 183 for Zone 230 releases or terminates the secondary link SL (shown by dotted line SL in FIG. 5C) and the zone controller 184 for the zone 240 picks up (i.e., establishes communication with) the MVS 100 via the secondary link SL as shown in FIG. 5D. The zone controller 183 for zone 230 releases the primary link PL (shown by dotted line SL in FIG. 5E) and the zone controller 184 for the Zone 240 establishes control of the MVS 100 via the primary link PL as shown in FIG. 5F. The MVS 100 continues to move along the predetermined assembly path AP in Zone 240 with the primary link PL and the secondary link SL in communication with zone controller 184 via the onboard communications link 122 and the zone controller communications link 184b as shown in FIG. 5G. It should be understood that in some variations of the present disclosure the interzone link IZL between the zone controllers 183 and 184 assists in the hand-off of control and management of the MVS 100 from zone 230 to zone 240.

Figure 5I:
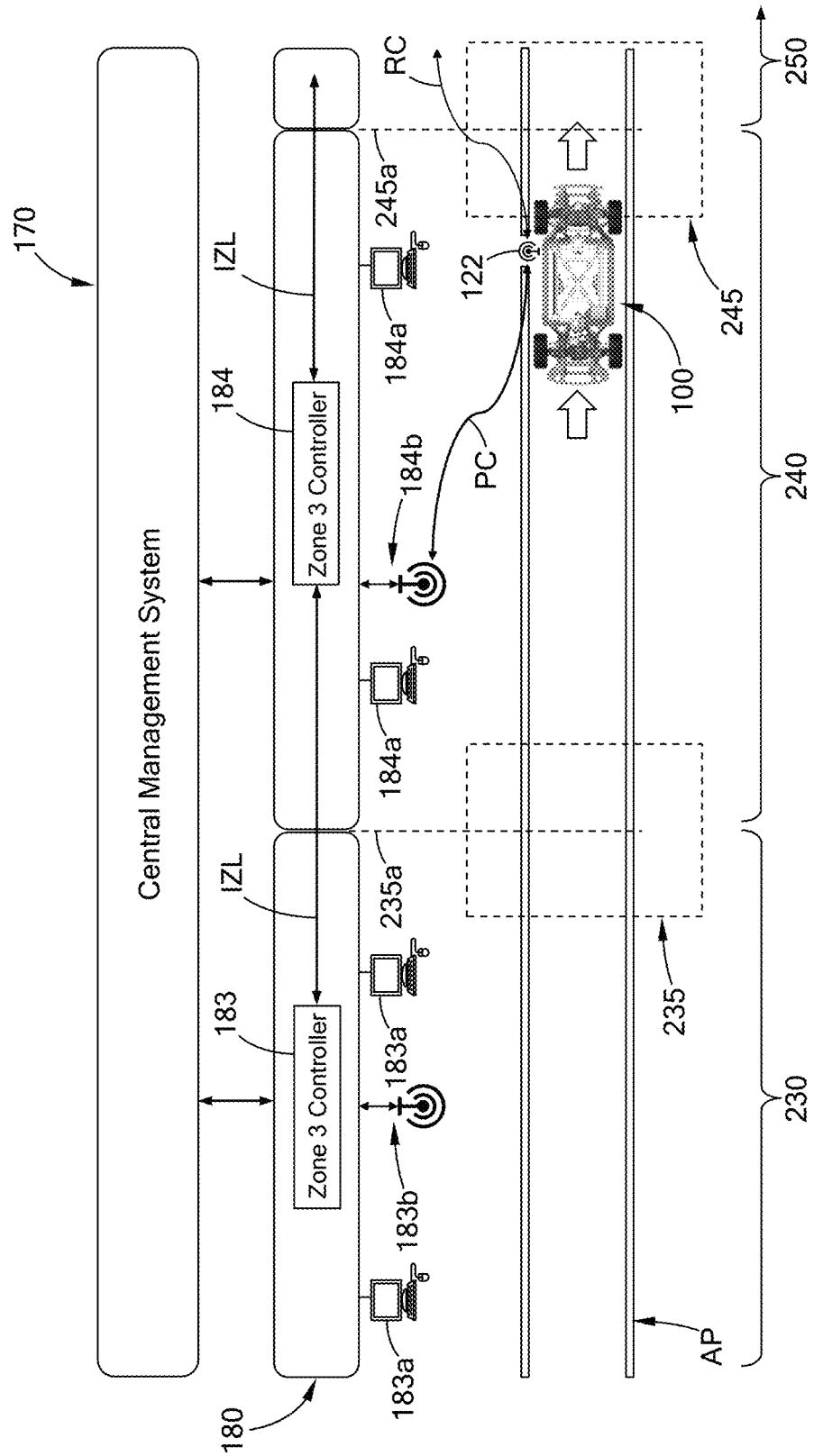
FIG. 5I shows the modular vehicle subassembly shown in FIG. 5A transitioning from the fourth zone to the fifth zone in FIG. 4 according to the teachings of the present disclosure.
Figure 5J:
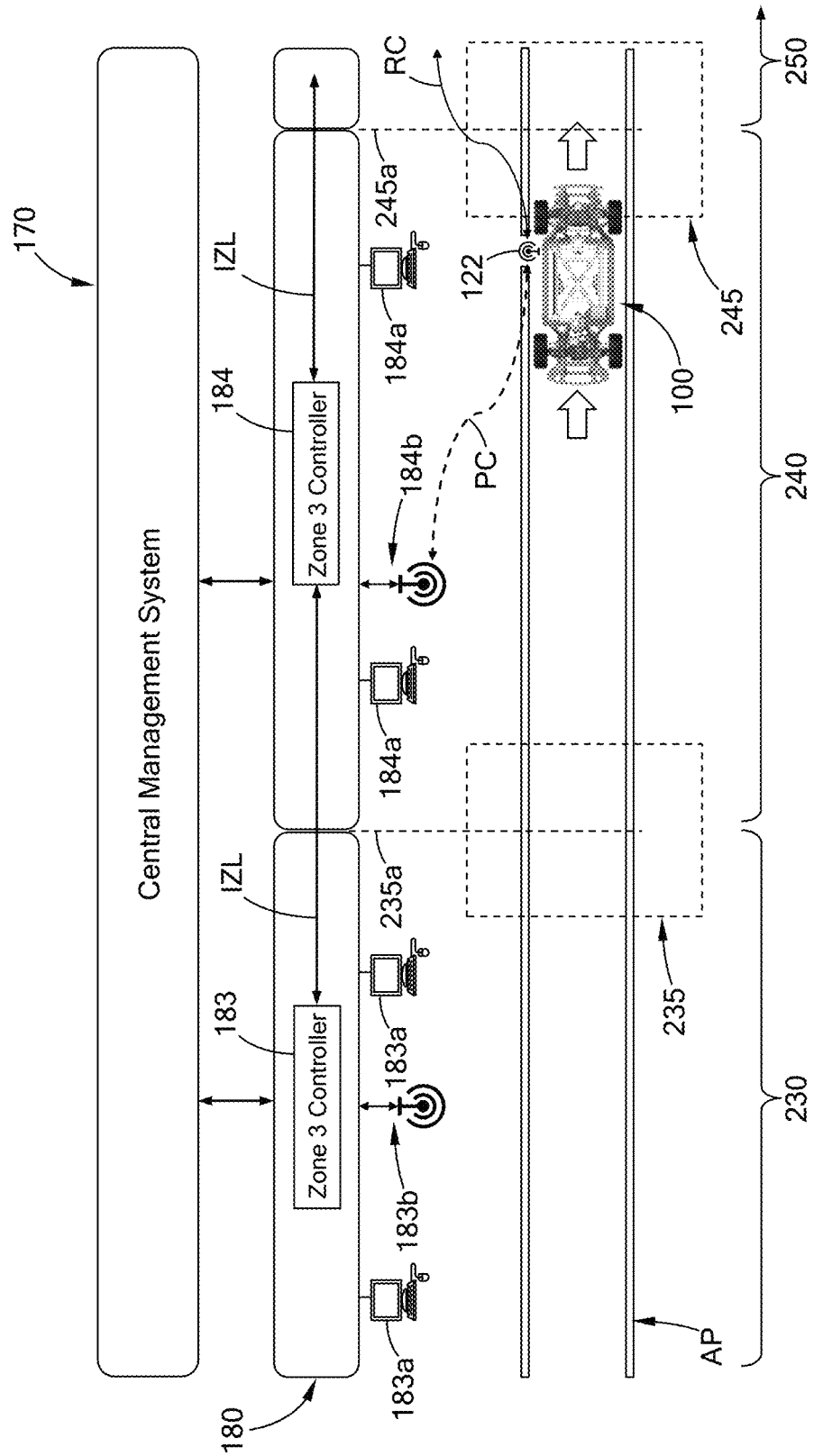
FIG. 5J shows the modular vehicle subassembly shown in FIG. 5A transitioning from the fourth zone to the fifth zone in FIG. 4 according to the teachings of the present disclosure.
Figure 5K:
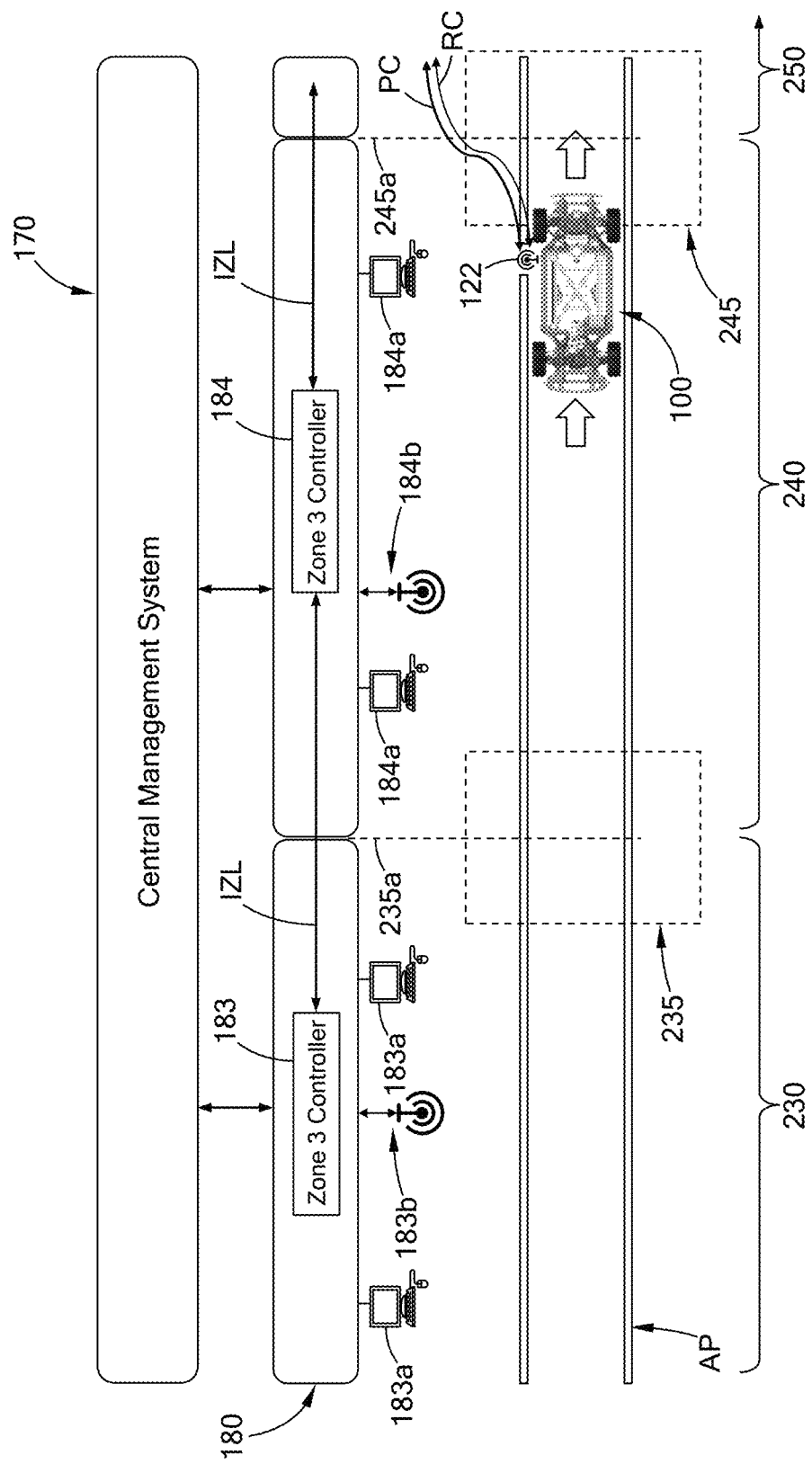
FIG. 5K shows the modular vehicle subassembly shown in FIG. 5A transitioned from the fourth zone to the fifth zone in FIG. 4 according to the teachings of the present disclosure.

Referring now to FIGS. 5H-5K "hand-off" of control and management of the MVS 100 from zone 240 to zone 250 is shown. Particularly, as the MVS 100 approaches zonal boundary 245a, the MVS 100 moves into the transition zone 245. At a predefined distance from the zonal boundary 245a the zone controller 184 for zone 230 releases or terminates the secondary link SL (shown by dotted line SL in FIG. 5H) and the zone controller 185 for the zone 250 (FIG. 4) picks up the MVS 100 via the secondary link SL as shown in FIG. 5I. The zone controller 184 for zone 230 releases the primary link PL (shown by dotted line SL in FIG. 5J) and the zone controller 185 for the zone 250 (FIG. 4) establishes control of the MVS 100 via the primary link PL as shown in FIG. 5K. The MVS 100 continues to move along the predetermined assembly path AP in zone 250 with the primary link PL and the secondary link SL in communication with zone controller 185 via the onboard communications link 122 and the zone controller communications link 185b (FIG. 4). It should be understood that in some variations of the present disclosure the interzone link IZL between the zone controllers 184 and 185 assists in the hand-off of control and management of the MVS 100 from zone 240 to zone 250.

It should be understood from FIGS. 5, 5A-5K and the discussion above, that the system 10 remotely controls a plurality of MVSs 100 such that the plurality of MVSs 100 move using their own power and steering along the assembly path AP. It should also be understood that control and movement of the plurality of MVSs 100 using the central management system 170 and the zone management system 180 reduces or eliminates the need for conveyor systems and/or automatic guided vehicle based systems. In some variations of the present disclosure, the system 10 remotely controls a first subset of MVSs 100 along a first predetermined assembly path, remotely controls a second subset of MVSs 100 along a second predetermined assembly path that is different than the first predetermined assembly path, remotely controls a third subset of MVSs 100 along a third predetermined assembly path that is different than the first and second predetermined assembly paths, and the like. That is, the system 10 according to the teachings of the present disclosure provides remote control and movement of individual MVSs 100 along specific predetermined assembly path APs such that assembled vehicles 100A with different vehicle options and accessories, and even different vehicle models, are manufactured within the vehicle assembly facility 20.

Figure 6:
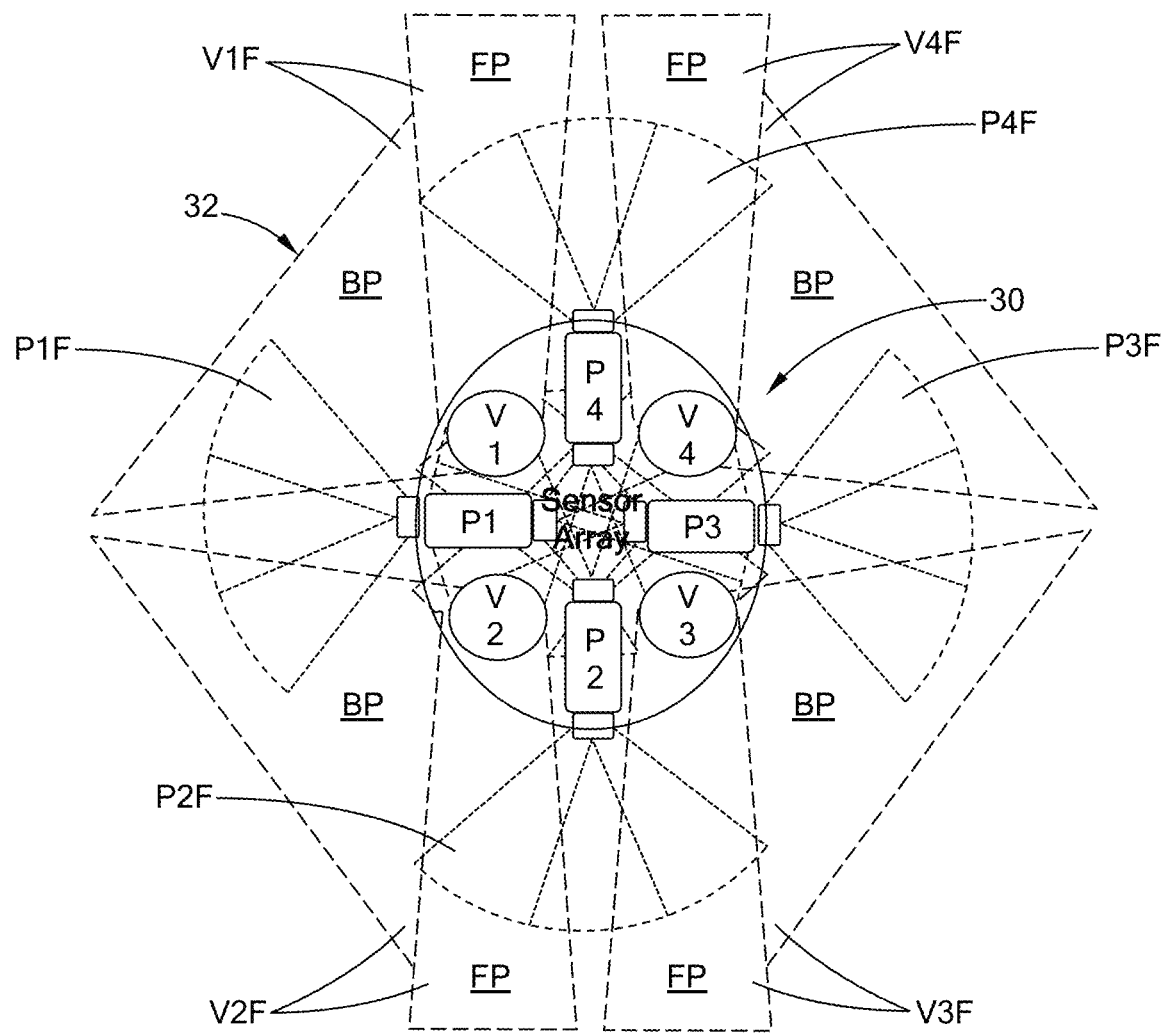
FIG. 6 is a combined sensors array and a combined sensors field array according to the teachings of the present disclosure.

As noted above with respect to FIG. 1, in some variations of the present disclosure the MVS 100 includes one or more sensors 130. In the alternative, or in addition to, facility-based sensors, e.g., overhead and/or ground based sensors, are integrated into the infrastructure of the vehicle assembly facility 20. For example, and referring to FIG. 6, in some variations the vehicle assembly facility 20 includes a combined sensor array 30 that provides a combined sensor array field 32. In the example shown in FIG. 6, the combined sensor array 30 includes four proximity sensors P1, P2, P3, P4, (also referred to herein as "proximity sensors P1-P4") and four visual sensors V1, V2, V3, V4 (also referred to herein as "visual sensors V1-V4"). The proximity sensors P1-P4 have four associated proximity sensor fields P1F, P2F, P3F, P4F, (also referred to herein as "proximity sensor fields P1F-P4F") and the visual sensors V1-V4 have four associated visual sensor fields V1F, V2F, V3F, V4F (also referred to herein as "visual sensor fields V1F-V4F"), that provide the combined sensor array field 32. In some variations, one or more of the visual sensors V1-V4 provide a focused path field 'FP' and/or a broad path field 'BP' as shown in FIG. 6. For example, the focused path fields FP provide or enable pathway alignment of an MVS 100 along the assembly path AP and the broad path fields BP provide or enable notification and tracking information of approaching objects.

Similar to sensors 130 discussed above with reference to FIG. 1, the proximity sensors P1-P4 and/or the visual sensors V1-V4 provide transient data to the onboard controller 120 and/or zone controllers 181, 182, . . . 185 thereby enhancing movement of the MVS 100 operation within the vehicle assembly facility 20. Non-limiting examples of transient data provided by the proximity sensors P1-P4 and/or the visual sensors V1-V4 include data on or related to MVS 100 location, MVS 100 position, MVS 100 movement within a vehicle assembly facility 20, obstacle detection along the assembly path AP (FIG. 3) such as location and/or movement of items encroaching onto the assembly path AP, and general environmental conditions along the assembly path AP, among others. It should be understood that the proximity sensors P1-P4 and/or the visual sensors V1-V4 provides the zone controllers 181, 182, . . . 185 with notification on how a given MVS 100 is performing operational activities such as alignment on the assembly path AP, tracking along the assembly path AP, and obstacle avoidance on the assembly path AP as the MVS 100 moves within the vehicle assembly facility 20. In the alternative, or in addition to, the proximity sensors P1-P4 and/or the visual sensors V1-V4 are configured to transmits at least one of geometric, thermal, acoustic, vibrational, and optical data to each of the zone controllers 181, 182, . . . 185.

Figure 7B:
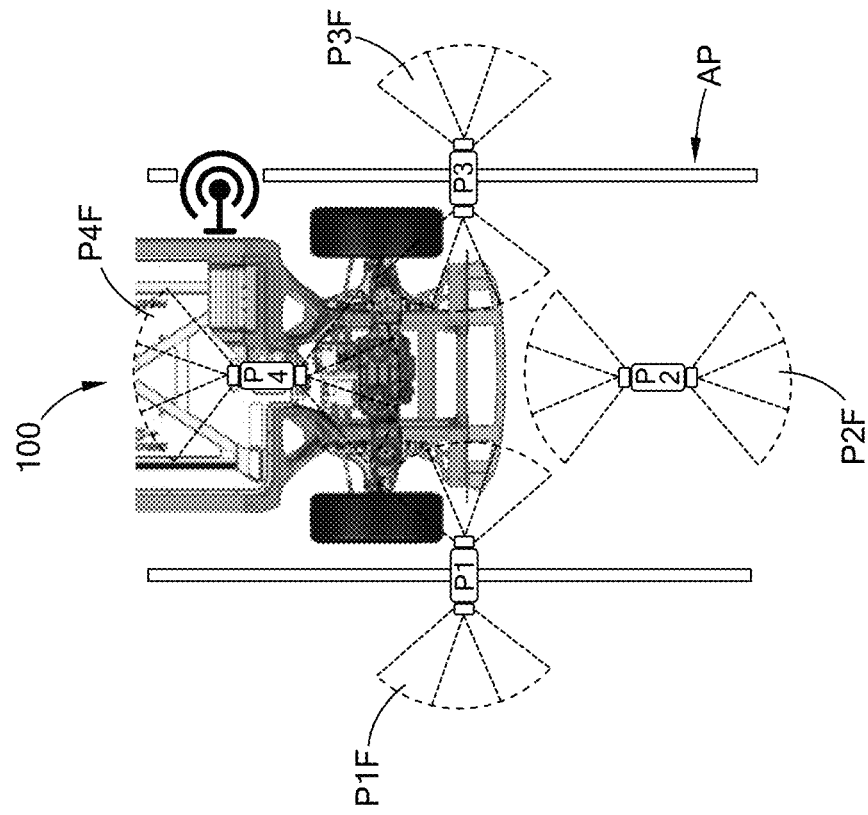
FIG. 7B shows another facility-based sensors array and a sensors field array according to the teachings of the present disclosure.
Figure 7A:
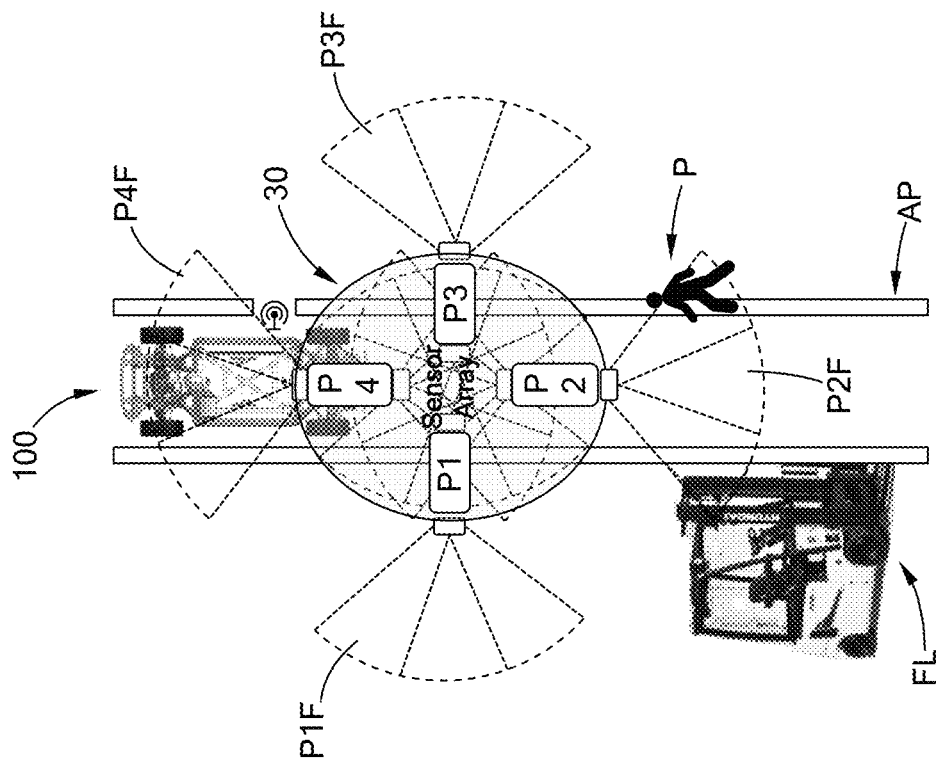
FIG. 7A shows a facility-based sensors array and a sensors field array according to the teachings of the present disclosure.

Referring to FIGS. 7A and 7B, one non-limiting example of the proximity sensor P2 detecting obstacles in the form of a forklift 'FL' and a person 'P' along the assembly path AP is shown in FIG. 7A and another non-limiting example of the proximity sensors P1, P3, P4 detecting the position and/or movement of an MVS 100 is shown in FIG. 7B. Accordingly, it should be understood that the proximity sensors P1-P4 provide or enable speed, location and distance information for approaching objects.

Figure 8:
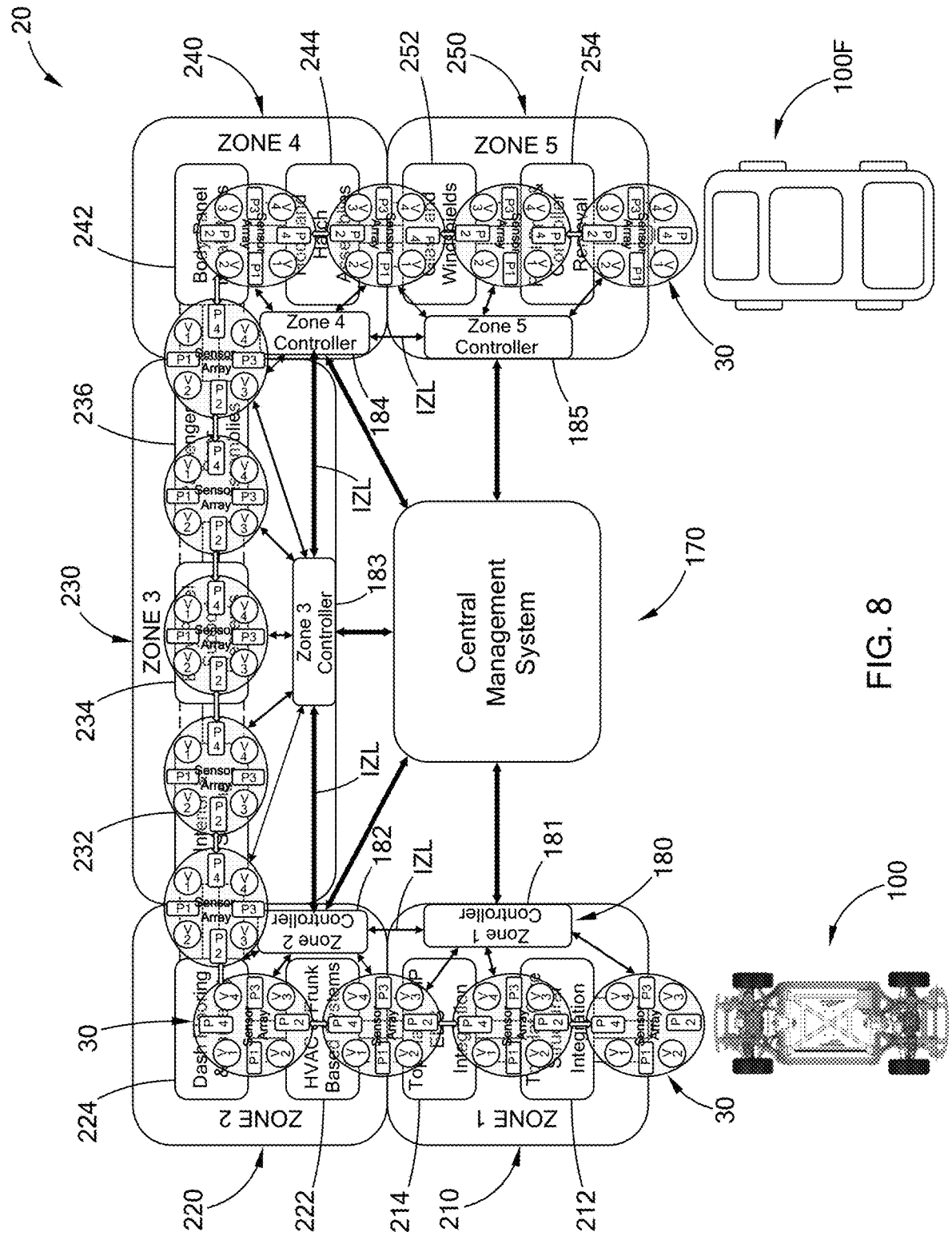
FIG. 8 shows the system for remote controlling the plurality of modular vehicle subassemblies in FIG. 4 with plant integrated sensors for guidance and control of the plurality of modular vehicle subassemblies according to the teachings of the present disclosure.

Referring to FIG. 8, the vehicle assembly facility 20 is shown with a plurality of combined sensor arrays 30 that provide information to the zone controllers 181, 182, . . . 185 (and central management system 170) such as alignment and tracking of the MVS 100 along the assembly path AP, notification and tracking of other objects along the assembly path AP, among others. It should be understood that the plurality of combined sensor arrays 30 assist in tracking movement of a plurality of MVSs 100 through the vehicle assembly facility 20 by providing transient data to a respective zone controller 181, 182, . . . 185. It should also be understood that an assembly path AP for one MVS 100 is different than an assembly path AP for another MVS 100. For example the assembly path for one or more of the MVSs 100 may not include movement through one or more of the zones 210, 220, . . . 250, and/or may include movement through additional zones not shown in FIG. 8. Also, one or more MVSs 100 can be redirected by the central management system 170 to a maintenance zone based on transient data received by one of the zone controllers 181, 182, . . . 185. And each of the MVSs 100 can be redirected or stopped based on an obstacle detection along, adjacent to, and/or within the assembly path AP for a given MVS 100.

It should be understood from the teachings of the present disclosure that a system and method for moving, controlling and monitor a plurality of modular vehicle subassemblies within and throughout a vehicle assembly facility is provided. The system and method provide for each of the modular vehicle subassemblies to move along its own predetermined assembly path with a set of predefined specifications such that assembled vehicles having different vehicle options and accessories, and even different vehicle models, are manufactured within a vehicle assembly facility 20.

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the term "module" and/or "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A system for remote control of a plurality of modular vehicle subassemblies within a vehicle assembly facility, the modular vehicle subassemblies being self-transportable and including a vehicle frame, an onboard controller, an onboard communications link, sensors, a drive system, wheels, a steering system, and a propulsion system, the system comprising:
a central management system having predetermined assembly paths and specifications for the modular vehicle subassemblies; and
a zone management system comprising a plurality of zone controllers in communication with the central management system and in communication with the onboard controllers of the modular vehicle subassemblies, the plurality of zone controllers configured to receive transient data from the onboard controllers of the modular vehicle subassemblies and manage movement of the modular vehicle subassemblies throughout a plurality of zones within the vehicle assembly facility, wherein:
the plurality of zone controllers are in communication with the modular vehicle subassemblies via a plurality of communications links,
the plurality of communications links include a plurality of primary links and a plurality of secondary links,
the plurality of primary links are configured to control the movement of the plurality of modular vehicle subassemblies,
the plurality of secondary links are configured to monitor the movement of the plurality of modular vehicle subassemblies,
the modular vehicle subassembly is communicably coupled to an active zone controller via the primary and secondary communication links when in the active zone, and
the modular vehicle subassembly is communicably coupled to the active zone controller via the primary communication link and an adjacent zone controller via the secondary communication links when the modular vehicle subassembly is in a transition zone between two active zones.

2. The system according to claim 1, wherein the plurality of communication links are provided by a plurality of wireless communications links.

3. The system according to claim 1, wherein the modular vehicle subassemblies are tethered for testing prior to entering a first active zone from among the two active zones.

4. The system according to claim 1, wherein the transient data comprises position of the modular vehicle subassemblies, status of systems of the modular vehicle subassemblies, current assembly state of the modular vehicle subassemblies, and proper positioning of parts on the modular vehicle subassemblies.

5. The system according to claim 4, wherein the status of systems comprises battery level, tire pressure, fluid levels, and fluid pressures.

6. The system according to claim 1, wherein the transient data is communicated to the central management system for management and control of a plurality of zone management systems.

7. The system according to claim 1, wherein the sensors of the modular vehicle subassemblies comprise a combined sensor array including optical sensors and proximity sensors.

8. The system according to claim 1 further comprising a plurality of fixed proximity sensors disposed within each of the plurality of zones within the vehicle assembly facility.

9. The system according to claim 1 further comprising a plurality of facility-based sensors disposed throughout the vehicle assembly facility, the plurality of facility-based sensors configured to transmit at least one of geometric, thermal, acoustic, vibrational, and optical data to each of the zone controllers.

10. A method for remote control of a plurality of modular vehicle subassemblies within a vehicle assembly facility, the modular vehicle subassemblies being self-transportable and including a vehicle frame, an onboard controller, sensors, a drive system, wheels, a steering system, and a propulsion system, the method comprising:
storing predetermined assembly paths and specifications for the modular vehicle subassemblies in a central management system;
receiving transient data from the onboard controllers of the modular vehicle subassemblies at a plurality of zone controllers, the plurality of zone controllers in communication with the central management system to compare the transient data with the predetermined assembly paths and specifications; and
remotely controlling movement of the modular vehicle subassemblies by the plurality of zone controllers based on the transient data, wherein:
the plurality of zone controllers are in communication with the modular vehicle subassemblies via a plurality of communications links,
the plurality of communications links include a plurality of primary links and a plurality of secondary links,
the plurality of primary links are configured to control the movement of the plurality of modular vehicle subassemblies,
the plurality of secondary links are configured to monitor the movement of the plurality of modular vehicle subassemblies,
the modular vehicle subassembly is communicably coupled to an active zone controller via the primary and secondary communication links when in the active zone, and
the modular vehicle subassembly is communicably coupled to the active zone controller via the primary communication link and an adjacent zone controller via the secondary communication links when the modular vehicle subassembly is in a transition zone between two active zones.

11. The method according to claim 10, wherein positions of each modular vehicle subassembly are communicated to the central management system.

12. The method according to claim 10, wherein the modular vehicle subassemblies are redirected by the central management system to a maintenance zone based on the transient data received by the zone controllers.

13. The method according to claim 10, wherein each zone controller monitors positions of incoming modular vehicle subassemblies from an active zone from among the two active zones.

14. The method according to claim 10, wherein each zone controller is in communication with adjacent zone controllers.

15. The method according to claim 10 further comprising redirecting or stopping the modular vehicle subassembly based on obstacle detection.

16. The method according to claim 10 further comprising redirecting the modular vehicle subassembly if a monitored path of the modular vehicle subassembly deviates from the predetermined assembly paths beyond a path tolerance.

17. A method of assembling a plurality of vehicles comprising:
providing a plurality of modular vehicle subassemblies within a vehicle assembly facility, the modular vehicle subassemblies being self-transportable and including a vehicle frame, an onboard controller, sensors, a drive system, wheels, a steering system, and a propulsion system;
storing predetermined assembly paths and specifications for the modular vehicle subassemblies in a central management system;
receiving transient data from the onboard controllers of the modular vehicle subassemblies at a plurality of zone controllers, the plurality of zone controllers in communication with the central management system to compare the transient data with the predetermined assembly paths and specifications;
remotely controlling movement of the modular vehicle subassemblies by the plurality of zone controllers based on the transient data throughout a plurality of zones within the vehicle assembly facility; and
successively assembling components to the modular vehicle subassemblies throughout the plurality of zones, wherein:
the plurality of zone controllers are in communication with the modular vehicle subassemblies via a plurality of communications links,
the plurality of communications links include a plurality of primary links and a plurality of secondary links,
the plurality of primary links are configured to control the movement of the plurality of modular vehicle subassemblies,
the plurality of secondary links are configured to monitor the movement of the plurality of modular vehicle subassemblies,
the modular vehicle subassembly is communicably coupled to an active zone controller via the primary and secondary communication links when in the active zone, and
the modular vehicle subassembly is communicably coupled to the active zone controller via the primary communication link and an adjacent zone controller via the secondary communication links when the modular vehicle subassembly is in a transition zone between two active zones.

18. The method according to claim 17, wherein a configuration of at least one of the plurality of vehicles can be modified during movement through the plurality of zones.

* * * * *